United States Patent
Jones

(10) Patent No.: US 6,571,807 B2
(45) Date of Patent: Jun. 3, 2003

(54) VEHICLE WASH SYSTEM INCLUDING A VARIABLE SPEED SINGLE PUMPING UNIT

(75) Inventor: Allen S. Jones, Bay of Islands (NZ)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/848,920

(22) Filed: May 4, 2001

(65) Prior Publication Data

US 2002/0002989 A1 Jan. 10, 2002

Related U.S. Application Data

(60) Provisional application No. 60/203,231, filed on May 8, 2000.

(51) Int. Cl.[7] .................................................. B08B 3/02
(52) U.S. Cl. ...................... 134/56 R; 134/123; 134/198
(58) Field of Search .............................. 134/56 R, 58 R, 134/123, 198; 415/51, 122.1, 146, 148; 417/326, 359, 423.7

(56) References Cited

U.S. PATENT DOCUMENTS

| | | | | |
|---|---|---|---|---|
| 3,687,156 A | * | 8/1956 | Minich, Jr. et al. | |
| 2,859,759 A | * | 11/1958 | Hurtwitz | |
| 3,606,091 A | * | 9/1971 | Grisham | |
| 3,773,065 A | * | 11/1973 | Mattox | |
| 3,775,799 A | | 12/1973 | Talbot et al. | ................... 15/21 |
| 3,853,272 A | * | 12/1974 | Decker et al. | |
| 3,977,603 A | * | 8/1976 | Magee, Jr. | |
| 4,050,109 A | * | 9/1977 | Learned | |
| 4,108,574 A | * | 8/1978 | Bartley et al. | |
| 4,140,442 A | * | 2/1979 | Mulvey | |
| 4,413,785 A | * | 11/1983 | Engelbet et al. | |
| 4,711,257 A | | 12/1987 | Kobayashi | ................. 134/56 R |
| 4,867,798 A | * | 9/1989 | Weikmann | |
| 4,999,763 A | | 3/1991 | Ousborne | ................... 364/140 |
| 5,098,023 A | | 3/1992 | Burke | ........................ 239/273 |
| 5,335,688 A | * | 8/1994 | Caviar | |
| 5,522,707 A | * | 6/1996 | Potter | |
| 5,595,201 A | * | 1/1997 | Dobrez et al. | |
| 5,806,542 A | | 9/1998 | Hoffer et al. | .................. 134/57 |
| 5,897,297 A | * | 4/1999 | Carter | |
| 5,913,984 A | * | 6/1999 | Lofdal | |
| 5,924,432 A | * | 7/1999 | Thies et al. | |
| 6,045,331 A | * | 4/2000 | Gehm et al. | |
| 6,235,111 B1 | * | 5/2001 | Comiso et al. | |
| 6,247,480 B1 | * | 6/2001 | Wegner | |
| RE37,674 E | * | 4/2002 | Carter | |
| 6,372,053 B1 | * | 4/2002 | Belanger et al. | |

FOREIGN PATENT DOCUMENTS

| | | |
|---|---|---|
| EP | 0 379 353 | 7/1990 |
| EP | 0 704 963 | 4/1996 |
| EP | 0 709 575 | 5/1996 |

* cited by examiner

Primary Examiner—Frankie L. Stinson
(74) Attorney, Agent, or Firm—Andrus, Sceales, Starke & Sawall, LLP

(57) ABSTRACT

A pumping system for a vehicle wash system in which the pumping system includes a single, variable speed pumping unit. The variable speed pumping unit includes a variable speed motor that is controlled by a variable frequency motor drive such that the single pumping unit supplies water at varying pressures to the vehicle wash system. The vehicle wash system includes a plurality of distribution manifolds that can be selectively opened to apply water and/or a chemical agent to the vehicle during the wash cycle. The variable speed pumping unit of the vehicle wash system is controlled by a wash controller such that the wash controller can selectively control the pressure of water flowing through the distribution manifolds.

18 Claims, 3 Drawing Sheets

VEHICLE WASH SYSTEM INCLUDING A VARIABLE SPEED SINGLE PUMPING UNIT

CROSS-REFERENCE TO RELATED APPLICATION

The present application is based on and claims priority to U.S. Provisional Application Serial No. 60/203,231 filed on May 8, 2000.

BACKGROUND OF THE INVENTION

The present invention relates to a pumping system used to distribute water and chemical agents through various applicators in a vehicle washing system. More specifically, the present invention relates to a pumping system that includes a single pumping unit that is controlled by a variable frequency drive to supply water and injected cleaning solutions at varying pressures to different areas of a vehicle washing system during different steps of a vehicle wash sequence.

Current pumping systems in vehicle washing systems incorporate individual pumps to perform different wash services during the washing process. For example, different individual pumps are used to supply water to various manifolds of the vehicle wash system at different pressures for various operations, such as a high pressure wash, a foaming wax and sealer or a spot-free rinse. In the current pumping systems, the individual pumps are set to generate specific pressures and flow rates depending upon the type of manifold to which the pump is supplying water.

Current pumping systems used in vehicle wash systems require that the various fluid circuits be hard plumbed to select the services and pressures for the customers. The hard plumbed connections between the individual pumps and the distribution manifolds limit the flexibility and adaptability of the washing system. Thus, operators in the field are not able to tune their wash systems for cleaning and water usage efficiency.

Therefore, it is an object of the present invention to provide a pumping system that includes a single pumping unit that can be operated at various speeds to supply water at different pressures by a variable frequency AC motor drive. Further, it is an object of the present invention to provide various valving and operating controls that allow the single pumping unit to distribute water and cleaning agents to the correct application manifold at the desired pressure.

SUMMARY OF THE INVENTION

The present invention relates to a pumping system for use in a vehicle wash system. The pumping system of the present invention includes a single pumping unit that is connected between a plurality of water supplies and distribution manifolds. The single pumping unit of the present invention can be driven at variable speeds to provide water at selected pressures for use during different portions of a vehicle wash cycle. A valving arrangement is utilized to control the distribution of the water from the single pumping unit to selectively apply the water and injected cleaning agent onto a vehicle being washed.

The operation of the single pumping unit of the invention is controlled by a variable frequency AC motor drive such that the motor drive can control the speed at which variable speed AC motor of the pumping unit operates. The variable frequency motor drive, in turn, is connected to a wash controller that is used to control not only the pumping unit, but also the valving arrangement used to distribute the water supply through the vehicle wash system.

The wash controller of the present invention is configured to control the valves connected to a plurality of cleaning agents and a plurality of different water inputs. Based upon the valve selection, a desired combination of the water supply and cleaning agent is supplied to the single pumping unit. The variable frequency motor drive controls operation of the single pumping unit such that the pumping unit supplies water at the desired pressure. The wash controller further controls a series of valves that direct the flow of water to one of a plurality of distribution manifolds. The distribution manifolds are used to supply either soap or rinse water, or other specific chemical agents, to the vehicle during the wash cycle.

The pumping system of the present invention allows the wash controller to develop different types of spray patterns at higher pressures for specific applications and develop spray patterns at lower pressures for other applications. By varying the output pressure of the pump by controlling the speed of the pump drive motor, the overall cycle time of the services is decreased, which aids in washing more vehicles per hour.

The pumping system of the present invention performs a "soft controlled" acceleration and deceleration of the fluid system, which improves the life of the pump and all of the valving of the system.

Further, the pumping system of the present invention allows downstream valving to be controlled based upon pressure. The downstream valving allows the wash controller to select manifolds and fluid paths without needing discrete electrical or pneumatic controls.

Further, the pumping system of the present invention reduces service calls and simplifies service problems, since only a single individual pumping unit needs to be serviced. Further, the pumping unit of the present invention reduces the overall size of the pumping system.

The wash controller of the present invention allows for the development of software to automatically adjust pressures supplied to the distribution manifolds based upon machine wear conditions. This feature of the invention allows the software to automatically increase the pressure when the wash controller senses nozzle wear.

Further, the pumping system of the present invention allows the wash controller to automatically adjust the pressure supplied by the pumping unit based upon different environmental conditions. For example, if a recent snowfall or ice condition exists, the wash controller can operate the pumping unit at higher flow rates to aid in removing salt and debris from the vehicle.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
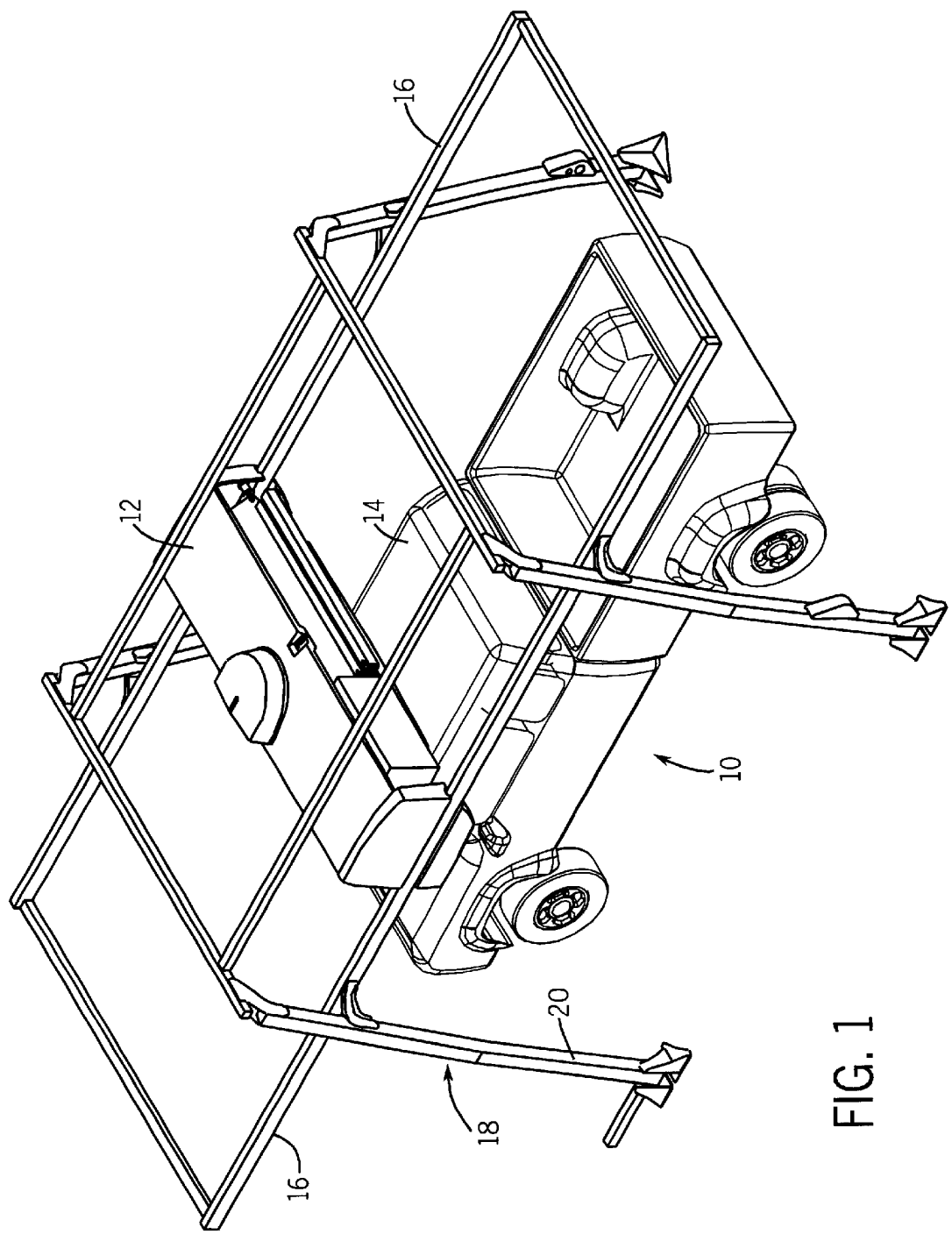
FIG. 1 is a perspective view illustrating the in-bay, touchless vehicle wash system of the present invention.

Referring first to FIG. 1, thereshown is a perspective view of a vehicle wash system 10 incorporating the pumping system of the present invention. The vehicle wash system 10 is preferably an in-bay vehicle wash system that includes an overhead gantry 12 mounted for movement above the vehicle 14 along a pair of spaced guide rails 16. The spaced guide rails 16 are supported in the vehicle wash bay by a support frame 18 that includes four spaced uprights 20. As can be seen in FIG. 1, the spaced uprights 20 allow the vehicle to pass in the longitudinal direction through the support frame 18. During the washing operation, the vehicle 14 is stationary while the overhead gantry 12 moves longitudinally along the guide rails 16 to wash the vehicle 14, as will be discussed in detail below.

Figure 2:
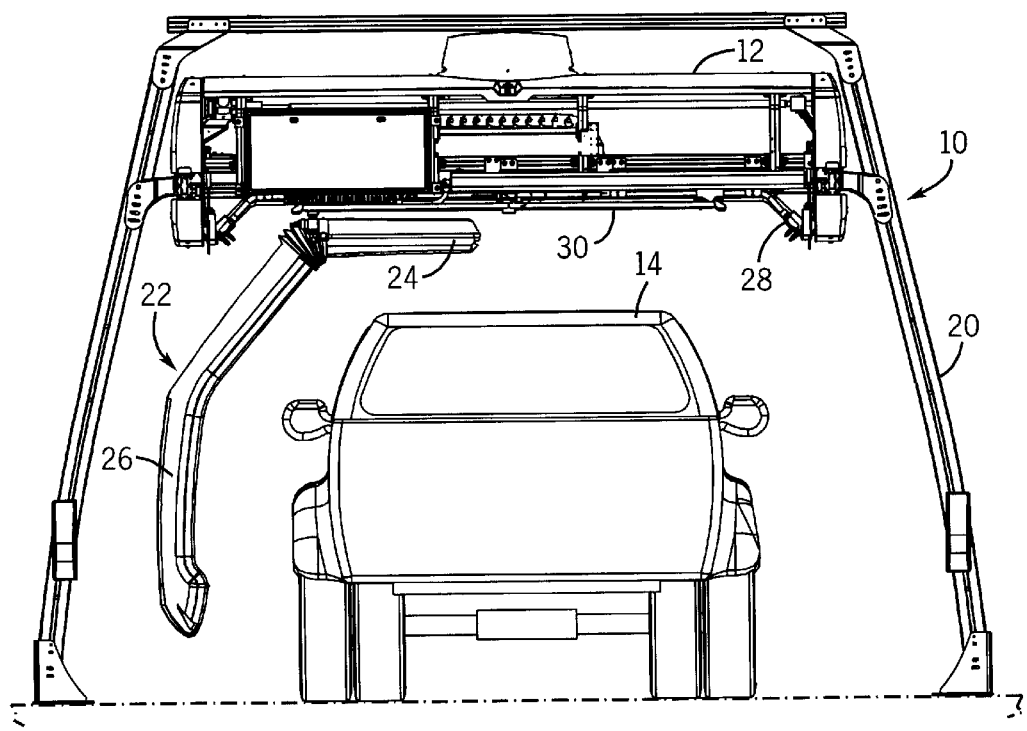
FIG. 2 is an end view of the vehicle wash system illustrating the plurality of distribution manifolds used to wash a vehicle.

Referring now to FIG. 2, the vehicle wash system 10 of the present invention includes a spray arch 22 pivotally mounted to the overhead gantry 12. The spray arch 22 includes a top arm 24 and a side arm 26. Both the top arm 24 and the side arm 26 include both a high pressure distribution manifold and a low pressure distribution manifold for use during the wash cycle. For example, when soap is initially being applied to the vehicle, the low pressure distribution manifold in both the top arm 24 and the side arm 26 are used to apply the soap to the vehicle 14. After the soap has been applied, rinse water is distributed through the high pressure distribution manifold in both the top arm 24 and the side arm 26.

In addition to the spray arch 22, the overhead gantry 12 includes a high pressure, top distribution manifold 28 and a low pressure, top distribution manifold 30. Both of the distribution manifolds mounted to the overhead gantry 12 can be used to distribute a cleaning agent and high pressure water during the wash process.

Figure 3:
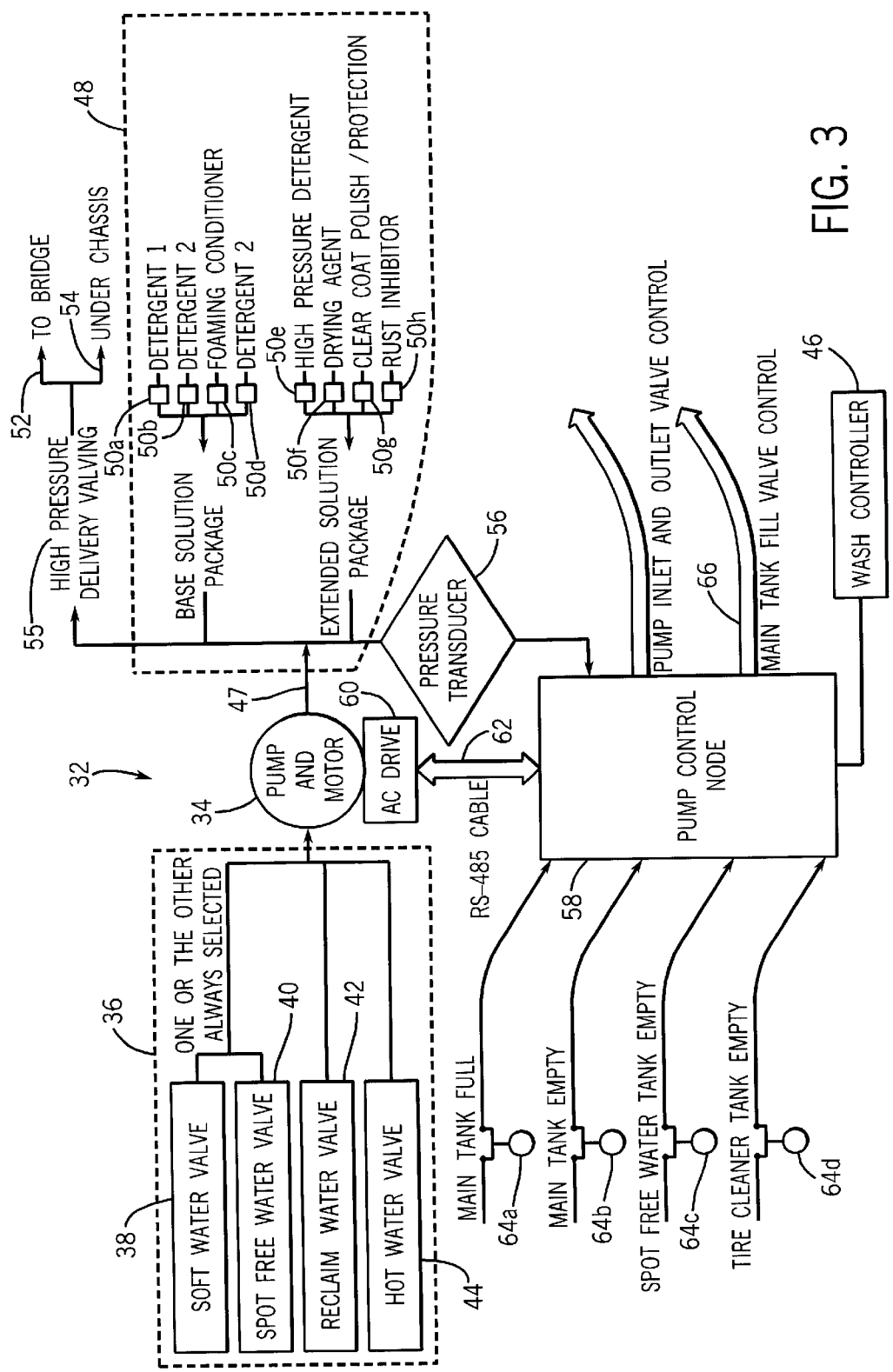
FIG. 3 is a schematic illustration depicting the single pumping unit and variable frequency AC motor drive of the present invention, as connected to the plurality of inlets and product connections.

Referring now to FIG. 3, thereshown is a schematic illustration of the pumping system 32 of the present invention. The pumping system 32 is centered around a single, variable speed pumping unit 34 that includes a fixed displacement pump driven by a variable speed AC motor. The pumping unit 34 is connected to one of a plurality of water inputs from a water input circuit 36. The water input circuit 36 includes a soft water valve 38 connected to a supply of soft water, a spot-free water valve 40 connected to a supply of spot-free water, a reclaim water valve 42 connected to a supply of reclaimed water, and a hot water valve 44 connected to a supply of heated water. The opening and closing of the valves 38-44 is controlled by a wash controller 46. The wash controller 46 is preferably a microcomputer that includes the desired operating steps and valve closing and opening instructions used during various consumer-selectable wash sequences, as will be described in greater detail below. Typically, the wash controller 46 is located behind the wall of the wash bay and is used by the owner of the vehicle wash system to control the operation of the vehicle wash system 10.

The pumping unit 34 generates an output flow along supply line 46. The output flow from the pumping unit 34 enters into a chemical injection system 48 that is used to selectively inject one or more cleaning agents into the supply of water. As illustrated in FIG. 3, the chemical injection system 48 includes a series of flow valves 50a–50g that each control the flow of one of a plurality of cleaning agents for introduction into the supply of water from the pump 34. Each of the flow valves 50a–50g is controlled by the wash controller 46 and is operable between an open and a closed position. When any of the flow valves 50a–50g are in the open position, the supply of cleaning agent flows into the supply of water to form a cleaning solution for delivery to a vehicle. Thus, the wash controller 46 is able to control the introduction of each of the plurality of cleaning agents into the supply of water prior to the cleaning solution being applied to the vehicle.

After the supply of water passes through the chemical injection system 48, the cleaning solution is diverted to either the bridge, as illustrated by line 52, or to an under-chassis wash system, as illustrated in line 54, by the high pressure delivery valving 55. When the cleaning solution is diverted to the bridge, the cleaning solution can then be diverted by a series of valves (not shown) controlled by the wash controller 46 to the high pressure or low pressure manifolds in both the side arm 26 and the top arm 24, or the gantry mounted top distribution manifolds, as previously described. Thus, the wash controller 46 is able to control not only the type of cleaning agent injected into the water being applied to the vehicle, but the specific location which the water and injected cleaning agent will be applied to the vehicle. In this manner, the wash controller 46, through the control of the various valving described, is able to more completely and accurately control the wash process of the vehicle contained within the vehicle wash system.

As shown in FIG. 3, a pressure transducer 56 is connected to the output of the pumping unit 34 to monitor the pressure of the water being supplied by the pumping unit 34. The pressure transducer 56 is coupled to a pump controller 58. As illustrated, the pump controller 58 is connected to a variable frequency AC motor drive 60 through an RS-485 cable 62. The variable frequency motor drive 60 is connected to the variable speed AC motor used to drive the fixed displacement pump of the pumping unit 34. The variable frequency motor drive 60 is able to control the speed of operation of the variable speed motor and the attached fixed displacement pump. Since the pumping unit 34 includes a fixed discharge port, the increase in speed of the pump increases the volume output and thus increases the pressure of the water supplied by the pumping unit 34. In the preferred embodiment of the invention, the fixed displacement pump of the pumping unit 34 is Model No. 2530, available from Cat Pumps located in Minneapolis, Minn.

The variable frequency motor drive 60 provides the required control signal to the variable speed AC motor of the pumping unit 34 to control the speed at which the pump operates and thus the pressure of water available at the pump outlet 47. In the preferred embodiment of the invention, the variable frequency AC motor drive 30 is Model MC1000, available from AC Technology Corporation, Uxbridge, Mass.

As illustrated in FIG. 3, the pump controller 58 is also coupled to the wash controller 46 such that the pump controller receives command signals from the wash controller 46 related to the desired pressure from the pumping unit 34. Based upon these desired pressure requirements, the pump controller 58 generates the proper operating signals to the variable frequency motor drive 60, which in turn controls the operation of the pumping unit 34. In this manner, the wash controller 46, through the pump controller 58, is able to supply water from the pumping unit 34 at the desired pressure by controlling the speed of operation of the motor driving the pump.

As shown in FIG. 3, the pump controller 58 is connected to a series of sensors 64a–64d that allow the pump controller 58 to monitor the current fill level of both the main tank and the spot-free water tank. Based on the signals, the pump controller 58 is able to control the main tank fill valve, as illustrated by control line 66.

As can be understood in the foregoing description, the wash controller 46 is able to control the type of water being pumped through the water input circuit 36. Further, the wash controller 46 is able to control the pressure at which the water is supplied by instructing the pump controller 58 to signal the variable frequency motor drive 60 to control the operational speed of the motor of the pumping unit 34. Once the desired water and pressure have been selected, the wash controller 46 can control the chemical injection system 48 to select the type of cleaning agent supplied to the selected water at the selected pressure. Finally, the wash controller 46 can control through which application manifold the water and cleaning agent are supplied by opening and closing a series of valves. Thus, the wash controller 46 is able to accurately control the wash process through the single pumping unit 34 and the valving arrangement described.

OPERATION

The operation of the pumping system 32 of the present invention will now be described with reference to FIG. 3. It should be understood that the following sequence of operations for the vehicle wash system including the pumping system of the present invention is only for illustrative purposes and various other operational sequences are contemplated as being within the scope of the present invention.

Initially, the pumping unit 34 is idle and the soft water inlet valve 38 is selected and all of the product valves 50a–50g are off. As the customer enters into the wash bay, the customer selects a wash package and the wash controller 46 accepts the customer entry and waits for the customer to correctly position the vehicle in the wash bay. The first level of service is an undercarriage/side blaster using reclaimed water. To carry out this service option, the wash controller 46 detects the vehicle and opens the reclaim water valve 42. Next, the wash controller 46 signals the pump controller 58 to have the variable frequency motor drive 60 operate the variable speed motor of the pumping unit 34 to produce a pressure of 800 psi, which is monitored by the pressure transducer 56. The flow of water from the pumping unit 34 is then directed to the underchassis, as illustrated by line 54.

Once the customer has passed through the undercarriage zone, the wash controller 46 instructs the pump controller 58 to stop operation. The pump controller 58 will turn off the required valves and instruct the variable frequency drive 60 to decelerate the pumping unit 34 to a stop.

Based upon the selected customer wash options, the wash controller 46 will open the soft water valve 38, select the detergent number one through the flow valve 50a and bring the pumping unit 34 to 200 psi. The wash controller will then give the required commands to begin supplying the low pressure water and soap through the low pressure arch manifolds in the side arm 26 and the top arm 24 of the spray arch 22, as illustrated in FIG. 2. Once the overhead gantry and spray arch 22 have moved around the vehicle to apply soap to the entire vehicle, the wash controller 46 will instruct the pump 34 to turn off. The pump controller 58 will perform the required steps and the service is complete.

In the next level of service, which is designated as a high pH detergent and soft water application through the low pressure arch manifold, the wash controller 46 will open the soft water valve 38, select the detergent number two through flow valve 50b and bring the pumping unit 34 to 200 psi. The wash controller will then supply the high pH detergent through the spray arch 22.

The next level of service, which is a high pressure wash using hot water, requires the wash controller 46 to open the hot water inlet valve 44, select no product and bring the pump to 1250 psi. The wash controller 46 will then begin applying the high pressure wash through the high pressure manifolds in the top and side arms of the spray arch 22 and on the overhead gantry 12.

The wash controller 46 includes a program delay to ensure that the correct pressures are met and then the wash controller may send new instructions to the pump controller 58 to decrease the pressure to 1000 psi. This feature allows the system to develop spray patterns fast and then allows the operator to select the correct pressure for cleaning and water consumption. Once the overhead gantry and spray arch have moved around the vehicle, the wash controller 46 will instruct the pumping unit 34 to turn off The next service option is a foaming wax and sealer wax through the top productivity manifold on the overhead gantry 12. To perform this function, the wash controller 46 opens the soft water valve 38, selects the foaming waxed product from flow valve 50c and the sealer wax product through flow valve 50g and brings the pump to 800 psi. The wash controller then operates the correct valves to ensure that the water and injected chemical agent flows through the high volume top manifold of the spray arch and the foaming wax top manifold on the overhead gantry. Once the overhead gantry and spray arch have reached the rear of the vehicle, the wash controller 46 will instruct the pump to turn off the foaming wax product but will continue the sealer wax service to ensure that it covers the full vehicle. After the overhead gantry has covered the fall vehicle, the wash controller 46 will instruct the pump to turn off.

The last wash option is a spot-free rinse through the high volume rinse manifold. Initially, the wash controller 46 will open the spot free water valve 40, select no product, and the pump controller 58 will bring the pumping unit 34 to 300 psi. The wash controller 46 will give the correct commands to begin service through the high volume top manifold. Once the overhead gantry and spray arch have moved over the vehicle, the wash controller 46 will turn off the pump.

Finally, the vehicle will pass beneath the vehicle dryer on its way out of the wash bay.

As can be understood by the foregoing description of a typical vehicle wash sequence, the wash controller 46 is able to control the single pumping unit 34 to provide various pressures for different wash sequences. Additionally, the wash controller is able to control the type of water and type of cleaning agent based upon control of a series of valves. In this manner, the single pumping unit 34 and the variable frequency drive 60 allow the wash system to operate while utilizing only the single variable speed motor and fixed displacement pump of the pumping unit 34.

Various alternatives and embodiments are contemplated as being within the scope of the following claims particularly pointing out and distinctly claiming the subject matter regarded as the invention.

I claim:

1. A vehicle wash system comprising:
   a plurality of distribution manifolds for applying water to a vehicle during a wash process;
   a variable speed pumping unit operable to supply a flow of water to the distribution manifolds, the variable speed pumping unit being operable at selectable speeds to vary the pressure of the flow of water to the distribution manifolds;
   a motor drive coupled to the variable speed pumping unit for controlling the speed of the pumping unit; and a wash controller coupled to the distribution manifolds to selectively permit the flow of water from the pump to enter into each of the distribution manifolds, wherein the wash controller controls the application of water to the vehicle by controlling the entry of the water into the plurality of distribution manifolds.

2. The vehicle wash system of claim 1 wherein the wash controller is coupled to the motor drive such that the wash controller signals the motor drive to control the speed of the pumping unit and thus the pressure of the flow of water from the pumping unit.

3. The vehicle wash system of claim 1 further comprising a chemical injection system including a plurality of cleaning agents, wherein the chemical injection system is operable to selectively inject at least one of the plurality of cleaning agents into the flow of water from the variable speed pumping unit.

4. The vehicle wash system of claim 3 wherein the chemical injection system includes a plurality of flow valves, each flow valve being associated with one of the plurality of chemical agents, wherein the operation of the flow valves is controlled by the wash controller.

5. The vehicle wash system of claim 1 wherein the variable speed pumping unit includes a variable speed AC motor that drives a fixed displacement pump.

6. The vehicle wash system of claim 5 wherein the motor drive is a variable frequency motor drive connected to the variable speed AC motor.

7. The vehicle wash system of claim 1 further comprising a pump controller connected to the motor drive for controlling the speed of the variable speed pumping unit, the pump controller being connected to the wash controller.

8. The vehicle wash system of claim 1 further comprising a water input circuit connected to the variable speed pumping unit, wherein the water input circuit includes a plurality of discrete water inputs.

9. The vehicle wash system of claim 8 wherein the wash controller is connected to the water input circuit such that the wash controller selects the water input to be supplied to the variable speed pumping unit.

10. A vehicle wash system for washing a stationary vehicle positioned within a wash bay, the vehicle wash system including an overhead gantry movable along the longitudinal length of the vehicle, the overhead gantry including a spray arch for applying water and a cleaning solution to the vehicle, the system comprising:

a plurality of wash process distribution manifolds, each of the plurality of distribution manifolds coupled to a fluid circuit control for selectively controlling the flow of water through each of the distribution manifolds;

a single, variable speed pumping unit operable to supply a flow of water to the plurality of distribution manifolds, the variable speed pumping unit being selectively operable to control the pressure of the flow of water provided to the distribution manifolds;

a motor drive coupled to the pump for controlling the speed of the pumping unit and the pressure of the flow of water from the pumping unit; and a wash controller coupled to the distribution valves for controlling the flow of water from the pumping unit through each of the distribution manifolds, wherein the wash controller is further coupled to the motor drive to selectively control the pressure of the flow of water from the pumping unit.

11. The vehicle wash system of claim 10 further comprising a chemical injection system including a plurality of cleaning agents, wherein the chemical injection system selectively injects at least one of the plurality of cleaning agents into the flow of water from the variable speed pumping unit.

12. The vehicle wash system of claim 11 wherein the chemical injection system is controlled by the wash controller.

13. The vehicle wash system of claim 10 further comprising a water input circuit coupled to a plurality of water inputs, wherein the wash controller is operable to control the water input circuit to selectively allow water from the plurality of water inputs to flow into the pumping unit.

14. The vehicle wash system of claim 10 wherein the variable speed pumping unit includes a variable speed Ac motor that drives a fixed displacement pump.

15. The vehicle wash system of claim 14 wherein the motor drive is a variable frequency motor drive connected to the variable speed AC motor.

16. A vehicle wash system comprising:

a plurality of distribution manifolds for applying water to a vehicle during a wash process;

a variable speed pumping unit operable to supply a flow of water to the distribution manifold, the variable speed pumping unit being operable at selectable speeds to vary the pressure of the flow of water to the distribution manifold;

a motor coupled to the variable speed pumping unit for controlling the speed of the pumping unit;

a chemical injection system in fluid communication with the output of the variable speed pumping unit, the chemical injection system including a plurality of cleaning agents and a plurality of flow valves, each flow valve being associated with one of the plurality of chemical agents, wherein the flow valves are selectively operable to inject the cleaning agents into the flow of water from the variable speed pumping unit;

a water input circuit in fluid communication with the variable speed pumping unit, the water input circuit including a plurality of discrete water inputs and a plurality of water valves, each water valve being associated with one of the water inputs, wherein the water valves are selectively operable to supply at least one of the water inputs to the variable speed pumping unit; and a wash controller coupled to the distribution manifold, the flow valves and the water valves to selectively permit the flow of water from the variable speed pumping unit to enter into the distribution manifold, wherein the wash controller controls the application of water to the vehicle by controlling the entry of the water into the plurality of distribution manifolds;

wherein the wash controller is operable to control the water valves to selectively allow water from the plurality of water inputs to flow into the pumping units;

wherein the wash controller is operable to control the flow valves to selectively allow the cleaning agents to flow into the output of the pumping unit.

17. The vehicle wash system of claim 16 wherein the variable speed pumping unit includes a variable speed AC motor that drives a fixed displacement pump.

18. The vehicle wash system of claim 16 wherein the motor drive is a variable frequency motor drive connected to the variable speed AC motor.

* * * * *